US012106540B2

(12) United States Patent
Chen et al.

(10) Patent No.: US 12,106,540 B2
(45) Date of Patent: Oct. 1, 2024

(54) SYSTEMS, METHODS, AND DEVICES FOR CAPTURING IMAGES

(71) Applicant: ZHEJIANG DAHUA TECHNOLOGY CO., LTD., Zhejiang (CN)

(72) Inventors: Meng Chen, Hangzhou (CN); Changhong Qin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 365 days.

(21) Appl. No.: 17/664,661

(22) Filed: May 24, 2022

(65) Prior Publication Data
US 2022/0284691 A1 Sep. 8, 2022

Related U.S. Application Data

(63) Continuation of application No. PCT/CN2020/132242, filed on Nov. 27, 2020.

(30) Foreign Application Priority Data

Dec. 5, 2019 (CN) .......................... 201911235029.7

(51) Int. Cl.
*G06T 7/20* (2017.01)
*G06T 7/70* (2017.01)
(Continued)

(52) U.S. Cl.
CPC .............. *G06V 10/443* (2022.01); *G06T 7/20* (2013.01); *G06T 7/70* (2017.01); *G06V 10/54* (2022.01); *G06V 10/56* (2022.01); *G06V 10/762* (2022.01)

(58) Field of Classification Search
CPC ...... G06V 10/443; G06V 10/54; G06V 10/56; G06V 10/762; G06T 7/20; G06T 7/70;
(Continued)

(56) References Cited

U.S. PATENT DOCUMENTS

2018/0165829 A1* 6/2018 Hong ................... G06V 10/772
2019/0303686 A1* 10/2019 Guo ....................... G06V 10/75
2019/0306409 A1 10/2019 Taki et al.

FOREIGN PATENT DOCUMENTS

CN 105791751 A 7/2016
CN 105979210 A 9/2016
(Continued)

OTHER PUBLICATIONS

International Search Report in PCT/CN2020/132242 mailed on Feb. 22, 2021, 4 pages.
(Continued)

*Primary Examiner* — Chuong A Ngo
(74) *Attorney, Agent, or Firm* — METIS IP LLC

(57) ABSTRACT

The present disclosure relates to systems, methods, and devices for capturing images. The system may determine at least one first object in a first monitoring image acquired by a first capture device. The system may determine a target monitoring position based on position information associated with the at least one first object in the first monitoring image. The system may obtain a second monitoring image associated with the target monitoring position acquired by a second capture device. The system may determine at least one second object in the second monitoring image. The system may identify at least one matched second object from the at least one second object based on relevancy information among the at least one second object and the at least one
(Continued)

first object. The system may direct the second capture device to capture at least one capture image of the at least one matched second object.

20 Claims, 13 Drawing Sheets

(51) Int. Cl.
*G06V 10/44* (2022.01)
*G06V 10/54* (2022.01)
*G06V 10/56* (2022.01)
*G06V 10/762* (2022.01)

(58) Field of Classification Search
CPC .. H04N 23/661; H04N 23/695; H04N 23/698; H04N 7/181; H04N 23/61
See application file for complete search history.

(56) References Cited

FOREIGN PATENT DOCUMENTS

| | | |
|---|---|---|
| CN | 106408551 A | 2/2017 |
| CN | 107093188 A | 8/2017 |
| CN | 108419014 A | 8/2018 |
| CN | 109584309 A | 4/2019 |
| CN | 109905641 A | 6/2019 |
| CN | 109922250 A | 6/2019 |
| CN | 110290352 A | 9/2019 |
| CN | 110519510 A | 11/2019 |
| WO | 2021109938 A1 | 6/2021 |

OTHER PUBLICATIONS

Written Opinion in PCT/CN2020/132242 mailed on Feb. 22, 2021, 5 pages.
The Second Office Action in Chinese Application No. 201911235029.7 mailed on Jun. 17, 2021, 20 pages.

* cited by examiner

1000

Determining a cluster by processing the position information associated with the at least one first object using a clustering algorithm — 1010

Determining the target monitoring position based on the cluster — 1020

```
┌─────────────────────────────────────────────────────┐
│ Determining motion information of a first object    │  1210
│ based on a plurality of first monitoring images     │
│ including the first object captured by a first      │
│ capture device                                      │
└─────────────────────────────────────────────────────┘
                          │
                          ▼
┌─────────────────────────────────────────────────────┐
│ Obtaining motion information of the second capture  │  1220
│ device                                              │
└─────────────────────────────────────────────────────┘
                          │
                          ▼
┌─────────────────────────────────────────────────────┐
│ Determining a target monitoring position based on   │  1230
│ the monition information of the at least one first  │
│ object and the motion information of the second     │
│ capture device                                      │
└─────────────────────────────────────────────────────┘
```

FIG. 12

SYSTEMS, METHODS, AND DEVICES FOR CAPTURING IMAGES

CROSS-REFERENCE TO RELATED APPLICATIONS

This application is a continuation of International Patent Application No. PCT/CN2020/132242, filed on Nov. 27, 2020, which claims priority to Chinese Patent Application No. 201911235029.7 filed on Dec. 5, 2019, the contents of which are incorporated herein by reference.

TECHNICAL FIELD

The present disclosure generally relates to the monitoring field, and in particular, to systems, methods, and devices for capturing images.

BACKGROUND

With the rapid development of computer science, multimedia communication, network transmission, and image processing technologies, video monitoring technology develops rapidly nowadays. Generally, different types of capture devices correspond to different parameters and may be used in combination to achieve different monitoring purposes. For example, a gun camera generally includes a relatively large FOV and a dome camera generally includes a relatively high resolution. Accordingly, the gun camera can be used to track objects to be captured and the dome camera can be used to capture objects. However, there may be multiple objects to be captured and the dome camera often repeatedly captures different objects, which reduces the efficiency of the monitoring process. Therefore, it is desirable to provide systems, methods, and devices for capturing images with improved efficiency.

SUMMARY

According to an aspect of the present disclosure, a method is provided. The method may be implemented on a computing device having at least one processor and at least one storage medium including a set of instructions for obtaining at least one image. The method may include determining at least one first object in a first monitoring image acquired by a first capture device. The method may include determining a target monitoring position based on position information associated with the at least one first object in the first monitoring image. The method may include obtaining a second monitoring image associated with the target monitoring position acquired by a second capture device. The method may include determining at least one second object in the second monitoring image. The method may include identifying at least one matched second object from the at least one second object based on relevancy information among the at least one second object and the at least one first object. For each of the at least one matched second object, a relevancy between the matched second object and one of the at least one first object may satisfy a preset matching condition. The method may further include directing the second capture device to capture at least one capture image of the at least one matched second object.

In some embodiments, the method may further include marking a first object that is matched with the matched second object for each of the at least one matched second object.

In some embodiments, at least one marked first object corresponding to the at least one matched second object may be ignored in a subsequent capturing process.

In some embodiments, the determining the target monitoring position based on the position information associated with the at least one first object in the first monitoring image may include obtaining a historical set including at least one historically marked object, identifying at least one negligible first object from the at least one first object based on relevancy information among the at least one first object and at least part of the at least one historically marked object, wherein for each of the at least one negligible first object, a relevancy between the negligible first object and one of the at least one historically marked object may satisfy a preset matching condition, excluding the at least one negligible first object from the at least one first object, and determining the target monitoring position based on position information associated with remainder first objects.

In some embodiments, the determining the target monitoring position based on the position information associated with the at least one first object in the first monitoring image may include determining a cluster by processing the position information associated with the at least one first object using a clustering algorithm, and determining the target monitoring position based on the cluster.

In some embodiments, the method may further include adjusting the clustering algorithm based on a shape of the second capture device.

In some embodiments, the determining the target monitoring position based on the position information associated with the at least one first object in the first monitoring image may include determining motion information of the first object for each of the at least one first object based on a plurality of first monitoring images including the first object acquired by the first capture device, obtaining motion information of the second capture device, and determining the target monitoring position based on the monition information of the at least one first object and the motion information of the second capture device.

In some embodiments, the relevancy information may be associated with at least one of position information of the at least one first object and the at least one second object or feature information of the at least one first object and the at least one second object.

In some embodiments, the feature information may include at least one of an attributive feature or an appearance feature.

In some embodiments, the appearance feature may include at least one of a contour, a texture, a color, a pixel value, a contrast, or a grayscale.

According to another aspect of the present disclosure, a system for obtaining at least one image is provided. The system may include a first determination module, a target monitoring position determination module, a second determination module, an identification module, and a capturing module. The first determination module may be configured to determine at least one first object in a first monitoring image acquired by a first capture device. The target monitoring position determination module may be configured to determine a target monitoring position based on position information associated with the at least one first object in the first monitoring image. The second determination module may be configured to obtain a second monitoring image associated with the target monitoring position acquired by a second capture device. The second determination module may be further configured to determine at least one second object in the second monitoring image. The identification module may be configured to identify at least one matched second object from the at least one second object based on relevancy information among the at least one second object and the at least one first object. For each of the at least one matched second object, a relevancy between the matched second object and one of the at least one first object may satisfy a preset matching condition. The capturing module may be configured to direct the second capture device to capture at least one capture image of the at least one matched second object.

In some embodiments, for each of the at least one matched second object, the first determination module may be further configured to mark a first object that is matched with the matched second object.

In some embodiments, to determine the target monitoring position based on the position information associated with the at least one first object in the first monitoring image, the target monitoring position determination module may be further configured to obtain a historical set including at least one historically marked object, identify at least one negligible first object from the at least one first object based on relevancy information among the at least one first object and at least part of the at least one historically marked object, wherein for each of the at least one negligible first object, a relevancy between the negligible first object and one of the at least one historically marked object may satisfy the preset matching condition, exclude the at least one negligible first object from the at least one first object, and determine the target monitoring position based on position information associated with remainder first objects.

In some embodiments, to determine the target monitoring position based on the position information associated with the at least one first object in the first monitoring image, the target monitoring position determination module may be configured to determine a cluster by processing the position information associated with the at least one first object using a clustering algorithm, and determine the target monitoring position based on the cluster.

In some embodiments, the target monitoring position determination module may be further configured to adjust the clustering algorithm based on a shape of the second capture device.

In some embodiments, for each of the at least one first object, to determine the target monitoring position based on position information associated with the at least one first object in the first monitoring image, the target monitoring position determination module may be further configured to determine motion information of the first object based on a plurality of first monitoring images including the first object captured by the first capture device, obtain motion information of the second capture device, and determine the target monitoring position based on the monition information of the at least one first object and the motion information of the second capture device.

According to another aspect of the present disclosure, a system for obtaining at least one image is provided. The system may include at least one storage device including a set of instructions and at least one processor configured to communicate with the at least one storage device. When executing the set of instructions, the at least one processor may be configured to direct the system to perform the following operations. The system may determine at least one first object in a first monitoring image acquired by a first capture device. The system may determine a target monitoring position based on position information associated with the at least one first object in the first monitoring image. The system may obtain a second monitoring image associated with the target monitoring position acquired by a second capture device. The system may determine at least one second object in the second monitoring image. The system may identify at least one matched second object from the at least one second object based on relevancy information among the at least one second object and the at least one first object. For each of the at least one matched second object, a relevancy between the matched second object and one of the at least one first object may satisfy a preset matching condition. The system may direct the second capture device to capture at least one capture image of the at least one matched second object.

According to yet another aspect of the present disclosure, a non-transitory computer readable medium is provided. The non-transitory computer readable medium may include executable instructions. When executed by at least one processor, the executable instructions may direct the at least one processor to perform a method. The method may include determining at least one first object in a first monitoring image acquired by a first capture device. The method may include determining a target monitoring position based on position information associated with the at least one first object in the first monitoring image. The method may include obtaining a second monitoring image associated with the target monitoring position acquired by a second capture device. The method may include determining at least one second object in the second monitoring image. The method may include identifying at least one matched second object from the at least one second object based on relevancy information among the at least one second object and the at least one first object. For each of the at least one matched second object, a relevancy between the matched second object and one of the at least one first object may satisfy a preset matching condition. The method may further include directing the second capture device to capture at least one capture image of the at least one matched second object.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10 is a flowchart illustrating an exemplary process for determining a target monitoring position according to some embodiments of the present disclosure;

FIG. 12 is a flowchart illustrating an exemplary process for determining a target monitoring position according to some embodiments of the present disclosure.

DETAILED DESCRIPTION

Figure 1:
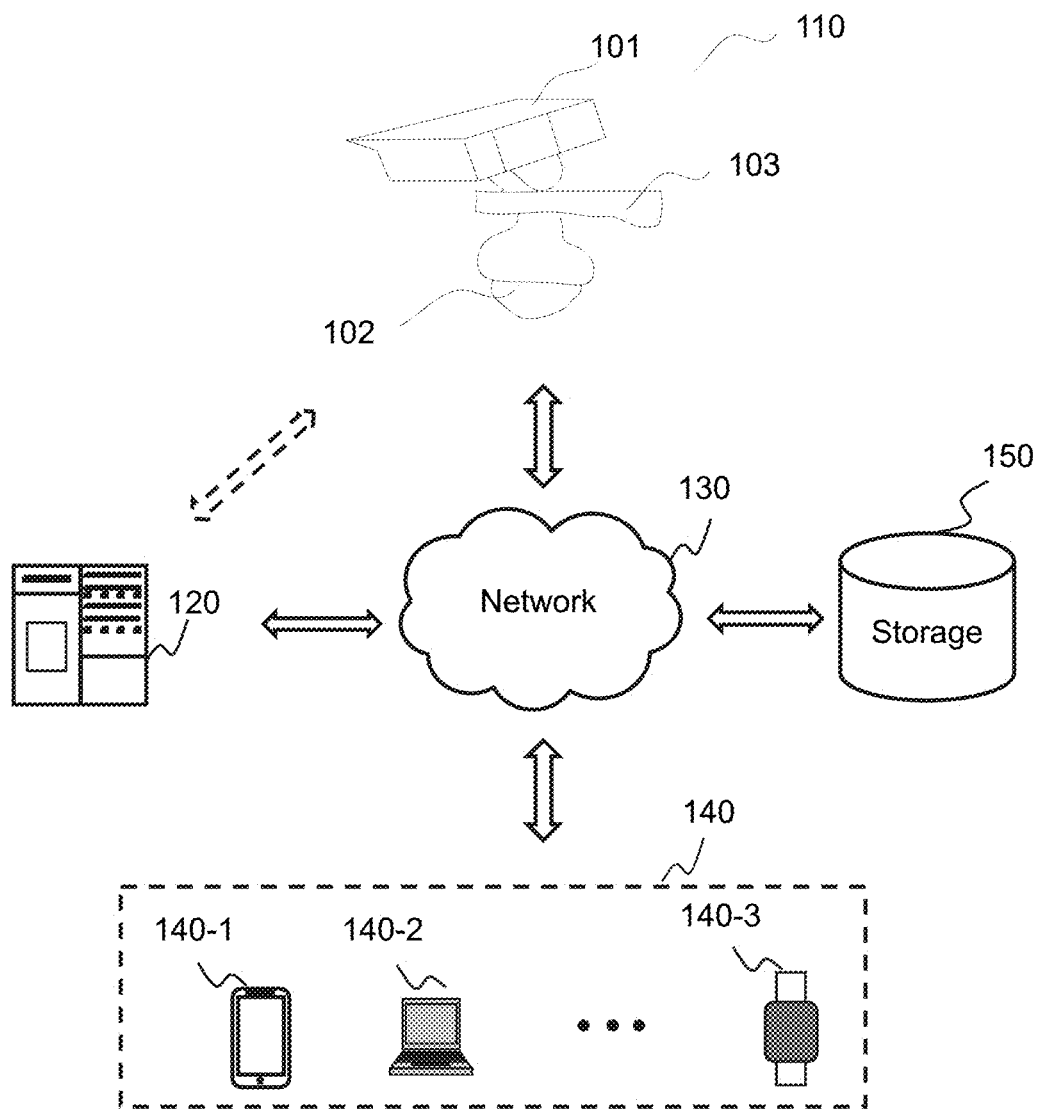
FIG. 1 is a schematic diagram illustrating an exemplary image capturing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the present disclosure, a representation of an object (e.g., a person, a vehicle) in an image may be referred to as an object for brevity. Further, an image including a representation of an object may be referred to as an image of an object or an image including an object for brevity. Still further, an operation performed on a representation of an object in an image may be referred to as an operation performed on an object for brevity.

An aspect of the present disclosure relates to methods, systems, and devices for capturing images. The system may determine at least one first object in a first monitoring image acquired by a first capture device. The system may determine a target monitoring position based on position information associated with the at least one first object in the first monitoring image. The system may obtain a second monitoring image associated with the target monitoring position acquired by a second capture device. The system may determine at least one second object in the second monitoring image. The system may identify at least one matched second object from the at least one second object based on first relevancy information among the at least one second object and the at least one first object. For each of the at least one matched second object, a relevancy between the matched second object and one of the at least one first object may satisfy a preset matching condition. The system may direct the second capture device to capture at least one capture image of the at least one matched second object. Further, for each of the at least one matched second object, the system may mark a first object that is matched with the matched second object, which may be ignored in a subsequent capturing process.

According to the present disclosure, a matching operation may be performed on the at least one first object and the at least one second object, matched object(s) may be captured and may be ignored in a subsequent capturing process, thereby reducing repeat capture rate and improving the efficiency of the system for capturing images.

FIG. 1 is a schematic diagram illustrating an exemplary image capturing system according to some embodiments of the present disclosure. In some embodiments, the image capturing system 100 may be applied in various fields, such as a security monitoring field, an industrial monitoring field, a traffic management field, a medical field, an entertainment field, or the like, or any combination thereof. As illustrated in FIG. 1, the image capturing system 100 may include a capture device 110, a processing device 120, a network 130, a terminal device 140, and a storage 150.

The capture device 110 may be configured to acquire (or capture) images or videos associated with one or more objects. In some embodiments, the images or videos may be two-dimensional (2D), three-dimensional (3D), four-dimensional (4D), etc. In some embodiments, the one or more objects may include a moving object (e.g., a walking person, a moving vehicle) and/or a still object (e.g., a still device, a still building, a road). In some embodiments, the capture device 110 may be added to or be part of a medical imaging device, a night-vision device, a radar device, a sonar device, an electronic eye, a camcorder, a thermal imaging device, a smartphone, a tablet PC, a laptop, a wearable device (e.g., 3D glasses), an eye of a robot, a vehicle traveling data recorder, an unmanned device (e.g., an unmanned aerial vehicle (UAV), a driverless car, etc.), a video gaming console, or the like, or any combination thereof.

In some embodiments, the capture device 110 may include a first capture device 101, a second capture device 102, and a controller 103.

The first capture device 101 may be configured to acquire a first monitoring image (also can be referred to as a "first monitoring frame in a first monitoring video") associated with at least one first object. In some embodiments, the first capture device 101 may be a capture device with a relatively large field of view (FOV). For example, the first capture device 101 may include a gun camera, an infrared camera, an ultra-low illumination camera, a fisheye lens panoramic camera, a multi-lens combined panoramic camera, etc.

The second capture device 102 may be configured to acquire a second monitoring image (also can be referred to as a "second monitoring frame in a second monitoring video") associated with at least one second object. In some embodiments, the second capture device 102 may be a capture device with a relatively high detail acquisition parameter. For example, the second capture device 102 may include a high-definition camera, a wide-dynamic high-definition camera, a dome camera, etc.

In some embodiments, the second capture device 102 also may be configured to capture at least one capture image of at least one matched second object each of which is matched with a corresponding first object in the first monitoring image. More descriptions regarding the matched second object may be found elsewhere in the present disclosure (e.g., FIG. 5 and the description thereof).

In some embodiments, the second capture device 102 may be the same as or different from the first capture device 101. For example, a type of the second capture device 102 may be the same as or different from that of the first capture device 101. As another example, parameters (e.g., a resolution, a FOV, a focal length) of the second capture device 102 may be the same as or different from that of the first capture device 101. As yet another example, a shape of the second capture device 102 may be the same as or different from that of the first capture device 101.

The controller 103 may be configured to obtain information and/or data (e.g., the first monitoring image, the second monitoring image, the at least one capture image) from the first capture device 101 and/or the second capture device 102 and control subsequent operations of the first capture device 101 and/or the second capture device 102. For example, the controller 103 may identify the at least one second matched second object from the at least one second object based on relevancy information among the at least one second object and the at least one first object, and direct the second capture device 102 to capture the at least one capture image of the at least one matched second object.

In some embodiments, the controller 103 or part of the controller 103 may be implemented by the processing device 120 or may be integrated into the processing device 120. In some embodiments, the controller 103 may be unnecessary and the functions of the controller 103 may be implemented by the processing device 120.

In some embodiments, the capture device 110 may also include a display configured to display the first monitoring image, the second monitoring image, the at least one capture image, etc. In some embodiments, the display may be disposed on the first capture device 101, the second capture device 102, and/or the controller 103. In some embodiments, the display may be unnecessary and the capture device 110 may be connected to or communicate with an external display device.

In some embodiments, the capture device 110 may be connected to and/or communicate with other components of the image capturing system 100. For example, the capture device 110 may be connected to the processing device 120 and transmit information and/or data (e.g., the first monitoring image, the second monitoring image, the at least one capture image) to the processing device 120 for further processing via the network 130 or directly. As another example, the capture device 110 may be connected to the storage 150 and transmit the information and/or data (e.g., the first monitoring image, the second monitoring image, the at least one capture image) to the storage 150.

The processing device 120 may be configured to process information and/or data to perform one or more functions described in the present disclosure. For example, the processing device 120 may determine at least one first object and at least one second object in the first monitoring image and the second monitoring image, respectively. As another example, the processing device 120 may generate an instruction to direct the second capture device 102 to capture the at least one capture image of the at least one matched second object.

In some embodiments, the processing device 120 may be a single server or a server group. The server group may be centralized or distributed. In some embodiments, the processing device 120 may be local or remote. For example, the processing device 120 may access/transmit information and/or data in/to the capture device 110, the terminal device 140, and/or the storage 150 via the network 130. As another example, the processing device 120 may be directly connected to the capture device 110, the terminal device 140, and/or the storage 150 to access/transmit information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 including one or more components illustrated in FIG. 2 in the present disclosure.

In some embodiments, the processing device 120 may include one or more processing engines (e.g., single-core processing engine(s) or multi-core processor(s)). Merely by way of example, the processing device 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof. In some embodiments, the processing device 120 may be part of the capture device 110.

The network 130 may be configured to facilitate communications among the components (e.g., the capture device 110, the processing device 120, the terminal device 140, and/or the storage 150) of the image capturing system 100. In some embodiments, the network 130 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The terminal device 140 may be configured to receive information and/or data from other components (e.g., the capture device 110, the processing device 120, and/or the storage 150) of the image capturing system 100, and/or send information and/or data to other components of the image capturing system 100. For example, the terminal device 140 may receive the first monitoring image, the second monitoring image, and/or the at least one capture image from one or more components (e.g., the first capture device 101 or the second capture device 102) of the capture device 110. As another example, the terminal device 140 may send instructions (e.g., image capture parameters) to other components of the image capturing system 100.

In some embodiments, the terminal device 140 may include a mobile device 140-1, a tablet computer 140-2, a wearable device 140-3, or the like, or any combination thereof. In some embodiments, the mobile device 140-1 may include a smart home device, a smart mobile device, a virtual reality device, an augmented reality device, or the like, or any combination thereof. The smart home device may include a smart lighting device, a control device of an intelligent electrical apparatus, a smart monitoring device, a smart television, a smart video camera, an interphone, or the like, or any combination thereof. The wearable device may include a bracelet, footgear, eyeglasses, a helmet, a watch, clothing, a backpack, an accessory, or the like, or any combination thereof. The smart mobile device may include a smartphone, a personal digital assistant (PDA), a gaming device, a navigation device, a point of sale (POS) device, or the like, or any combination thereof. The virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc.

In some embodiments, the terminal device 140 may remotely operate the capture device 110. In some embodiments, the terminal device 140 may operate the capture device 110 via a wireless connection. In some embodiments, the terminal device 140 may receive information and/or instructions inputted by a user, and send the received information and/or instructions to the capture device 110 or the processing device 120 via the network 130. In some embodiments, the terminal device 140 may receive data and/or information from the processing device 120. In some embodiments, the terminal device 140 may be omitted or be part of the processing device 120.

The storage 150 may be configured to store data and/or instructions. In some embodiments, the storage 150 may store data obtained from the processing device 120 and/or the capture device 110. For example, the storage 150 may store the first monitoring image, the second monitoring image, and/or the at least one capture image captured by the capture device 110. In some embodiments, the storage 150 may store data and/or instructions that the processing device 120 may execute or use to perform exemplary methods described in the present disclosure. For example, the storage 150 may store instructions that the processing device 120 may execute to determine the at least one first object and the at least one second object in the first monitoring image and the second monitoring image respectively. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 130 to communicate with one or more components (e.g., the capture device 110, the processing device 120, the terminal device 140) of the image capturing system 100. One or more components in the image capturing system 100 may access the data or instructions stored in the storage 150 via the network 130. In some embodiments, the storage 150 may be directly connected to or communicate with one or more components (e.g., the capture device 110, the processing device 120, and the terminal device 140) of the image capturing system 100. In some embodiments, the storage 150 may be part of the capture device 110, the processing device 120, and/or the terminal device 140.

In some embodiments, two or more components of the image capturing system 100 may be integrated into one device. For example, the capture device 110, the processing device 120, and the storage 150 may be combined as a single device (e.g., a camera, a smartphone, a laptop, a workstation, a server). As another example, the first capture device 101 and the second capture device 102 may be combined as a single device to perform functions of the first capture device 101 and the second capture device 102.

It should be noted that the component of the image capturing system 100 illustrated in FIG. 1 may be implemented in various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or a data carrier such as an optical signal carrier or electric signal carrier. The systems and the methods in the present application may be implemented by a hardware circuit in a programmable hardware device in an ultra large scale integrated circuit, a gate array chip, a semiconductor such as a transistor, a field-programmable gate array, a programmable logic device, a software performed by various processors, or a combination thereof (e.g., firmware).

Figure 2:
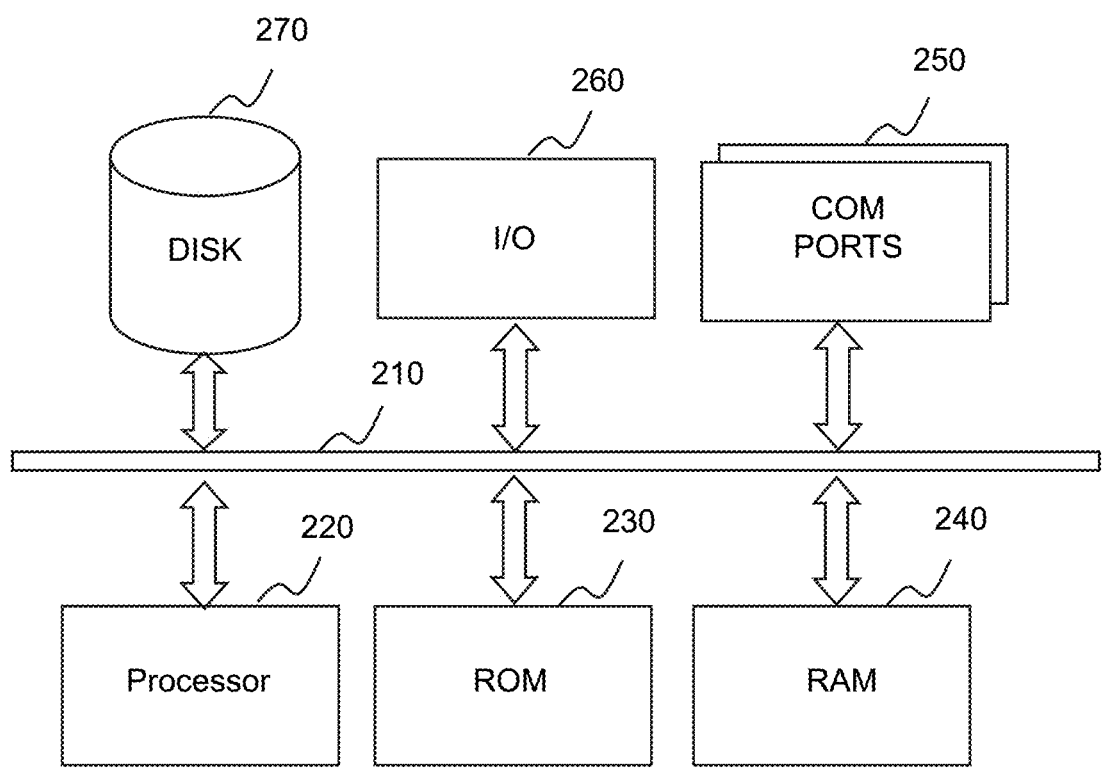
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 120 may be implemented on the computing device 200 and configured to perform functions of the processing device 120 disclosed in this disclosure.

The computing device 200 may be used to implement any component of the image capturing system 100 as described herein. For example, the processing device 120 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an input/output (I/O) component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
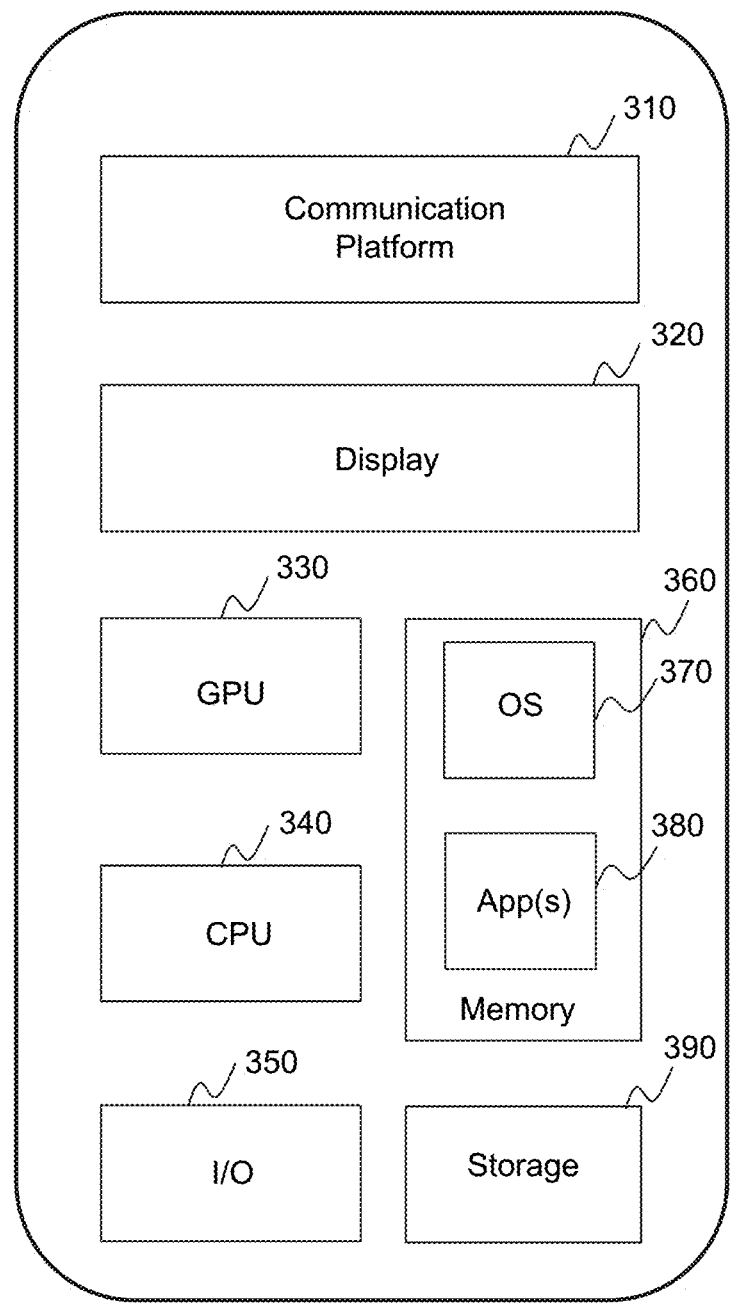
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the terminal device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™' Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image capturing or other information from the processing device 120. User interactions may be achieved via the I/O 350 and provided to the processing device 120 and/or other components of the image capturing system 100 via the network 130.

Figure 4:
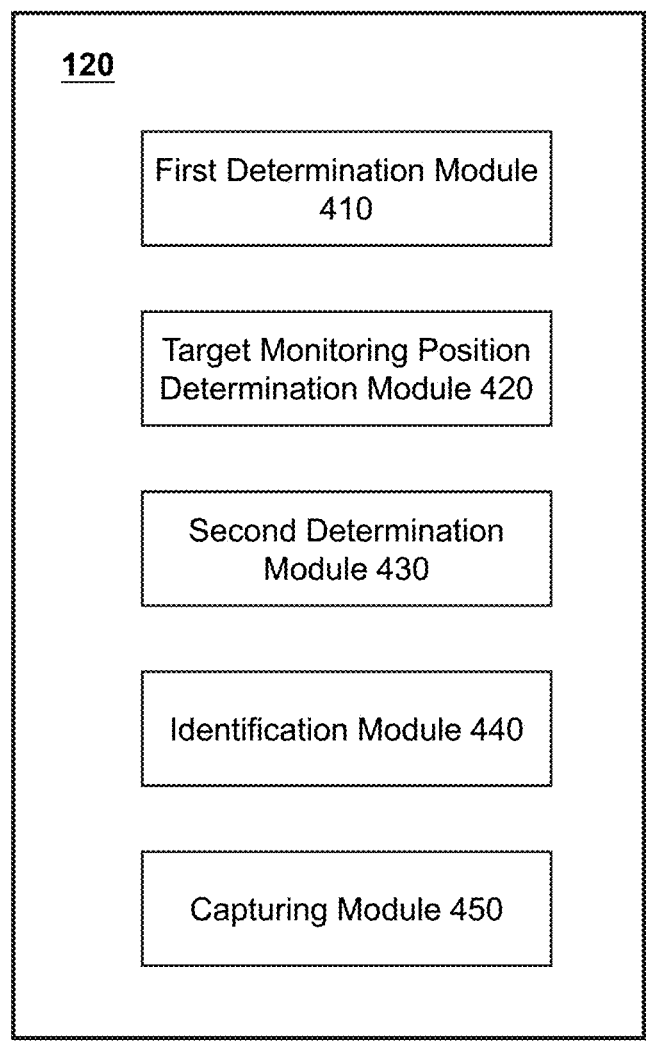
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may include a first determination module 410, a target monitoring position determination module 420, a second determination module 430, an identification module 440, and a capturing module 450.

The first determination module 410 may be configured to determine at least one first object in a first monitoring image acquired by a first capture device. In some embodiments, the first determination module 410 may determine the at least one first object in the first monitoring image based on various approaches. For example, the first determination module 410 may determine the at least one first object in the first monitoring image using an image detection algorithm. As another example, the first determination module 410 may extract image features of the first monitoring image using a feature detection model or a feature extraction algorithm and determine the at least one first object based on the image features. More descriptions regarding the obtaining of the first object in the first monitoring image to be processed may be found elsewhere in the present disclosure (e.g., operation 510 and the description thereof). In some embodiments, the first determination module 410 may be configured to obtain a historical set including at least one historically marked object, e.g., from a first capture device (e.g., the first capture device 101), a second capture device (e.g., the second capture device 102), a controller (e.g., the controller 103), and/or a storage device.

The target monitoring position determination module 420 may be configured to determine a target monitoring position based on position information associated with the at least one first object in the first monitoring image. In some embodiments, the target monitoring position determination module 420 may determine a reference point based on the position information associated with the at least one first object and determine the target monitoring position based on the reference point. In some embodiments, the target monitoring position determination module 420 may determine the target monitoring position based on the reference point and a position mapping relationship between the first capture device and the second capture device when the two capture devices monitor a same area or similar areas (e.g., partially overlapped areas). In some embodiments, the processing device 120 may determine the target monitoring position based on the at least one historically marked object.

The second determination module 430 may be configured to obtain a second monitoring image associated with the target monitoring position acquired by the second capture device and determine at least one second object in the second monitoring image. More descriptions regarding the obtaining of the second monitoring image and the at least one second object in the second monitoring image may be found elsewhere in the present disclosure (e.g., operation 530 and operation 540 and the descriptions thereof, respectively).

The identification module 440 may be configured to identify at least one matched second object from the at least one second object based on relevancy information among the at least one second object and the at least one first object. More descriptions regarding the identification of the at least one matched second object may be found elsewhere in the present disclosure (e.g., operation 550 and the description thereof).

The capturing module 450 may be configured to direct the second capture device to capture at least one capture image of the at least one matched second object. More descriptions regarding the capture of the at least one capture image of the at least one matched second object may be found elsewhere in the present disclosure (e.g., operation 560 and the description thereof).

The modules in the processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the first determination module 410, the target monitoring position determination module 420, and/or the second determination module 430 may be combined as a receiving and transmission module which may be configured to perform the functions thereof. As another example, the identification module 440, and/or the capturing module 450 may be combined as a processing module that may be configured to perform the functions thereof.

Figure 5:
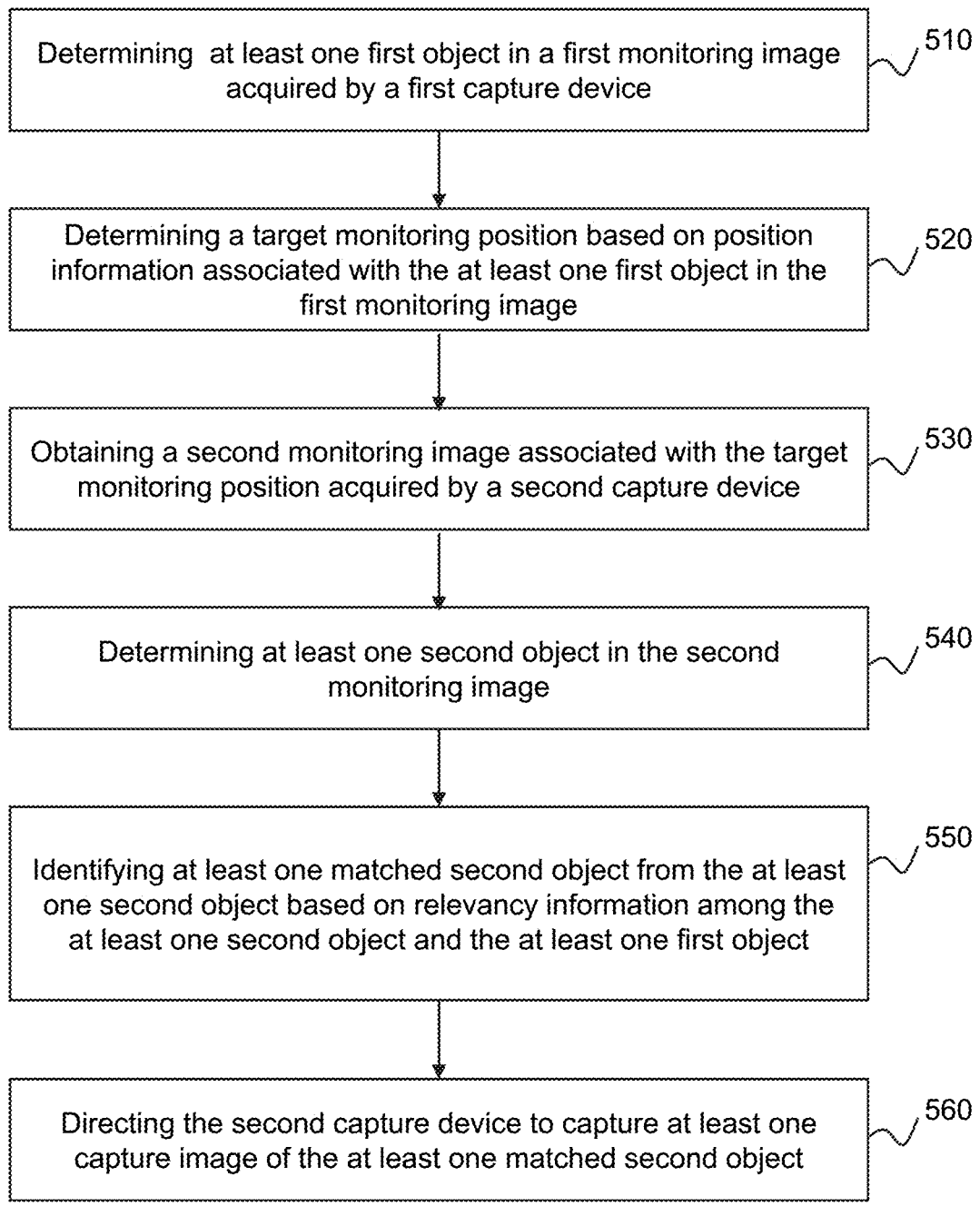
FIG. 5 is a flowchart illustrating an exemplary process for capturing at least one capture image of an object according to some embodiments of the present disclosure.

FIG. 5 is a flowchart illustrating an exemplary process for capturing at least one capture image of an object according to some embodiments of the present disclosure. In some embodiments, the process 500 may be implemented as a set of instructions (e.g., an application) stored in the storage ROM 230 or RAM 240. The processor 220 and/or the modules illustrated in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, the processing device 120 (e.g., the first determination module 410) may determine at least one first object (also referred to as "object to be captured") in a first monitoring image acquired by a first capture device (e.g., the first capture device 101).

In some embodiments, as described in connection with FIG. 1, the first monitoring image may be a monitoring frame in a monitoring video acquired by the first capture device. In some embodiments, the first monitoring image may be a set of monitoring frames corresponding to a series of time points (e.g., time points from T1 to Tn, wherein n refers to any positive integer greater than 1) in the monitoring video.

In some embodiments, a format of the first monitoring image may include but not limited to a graphics interchange format (GIF), a tag image file format (TIFF), a joint photographic expert group (JPEG) format, a tagged graphics (TGA) format, an exchangeable image file format (EXIF), etc.

In some embodiments, the processing device 120 may determine the at least one first object in the first monitoring image based on various approaches. For example, the processing device 120 may determine the at least one first object in the first monitoring image using an image detection algorithm. Specifically, the processing device 120 may segment the first monitoring image into a plurality of blocks using a segmentation approach (e.g., a multi-scale sliding-window approach, a selective search approach, a neural network). Then the processing device 120 may extract feature information of each of the plurality of blocks. Further, for each of the plurality of blocks, the processing device 120 may determine whether the block corresponds to an object based on the feature information of the block. Accordingly, the processing device 120 may determine the at least one first object in the first monitoring image.

In some embodiments, the processing device 120 may extract image features of the first monitoring image using a feature detection model or a feature extraction algorithm and determine the at least one first object based on the image features. Exemplary feature detection models may include a Visual Geometry Group Network (VGG) model, an Inception NET model, a Fully Convolutional Networks (FCN) model, a segmentation network (SegNet) model, a Mask-Region convolutional neural networks (Mask-RCNN) model, or the like, or any combination thereof. Exemplary feature extraction algorithms may include a Histogram of Oriented Gradient (HOG), a Local Binary Pattern (LBP) algorithm, a Scale Invariant Feature Transform (SIFT) algorithm, a Haar-like algorithm, a Gray-level co-occurrence matrix (GLCM), a Hough transform, a Fourier transform, a Fourier shape deors, a shape factor, a Finite Element Method (FEM), a Turning, a Wavelet Deor, or the like, or any combination thereof.

In 520, the processing device 120 (e.g., the target monitoring position determination module 420) may determine a target monitoring position based on position information associated with the at least one first object in the first monitoring image. As used herein, the target monitoring position may refer to a position (or a region) that a second capture device (e.g., the second capture device 102) monitors to acquire monitoring image(s) including object(s) which are at least partially the same as the at least one first object in the first monitoring image.

In some embodiments, take a specific first object as an example, position information of the first object may be expressed by coordinates. For example, the position information of the first object may include a coordinate of any point (e.g., a center point, a boundary point) of the first object in a coordinate system (also referred to as a "first coordinate system," e.g., a coordinate system with a center of the first monitoring image as the origin and a predetermined length (e.g., 1 cm) as unit) of the first monitoring image, an average coordinate of multiple points of the first object, etc. Accordingly, the position information associated with the at least one first object may include a coordinate of any point (e.g., a center point, a boundary point) of a selected first object (e.g., a first object selected by a user or according to system default), an average coordinate of the at least one first object, etc.

In some embodiments, the processing device 120 may determine a reference point based on the position information associated with the at least one first object and determine the target monitoring position based on the reference point. In some embodiments, the reference point may be a point (e.g., a center point, a boundary point) in any of the at least one first object, a point corresponding to the average coordinate of the at least one of the first object, a cluster point (e.g., a center point of a cluster) of the at least one first object, etc. More descriptions regarding the reference point may be found elsewhere in the present disclosure (e.g., FIG. 10 and the description thereof).

In some embodiments, the reference point may be determined manually, automatically, or semi-automatically. For example, the first monitoring image may be transmitted to a terminal device (e.g., the terminal device 140) for display and a user may annotate the reference point in the first monitoring image via a user interface implemented on the terminal device. As another example, the processing device 120 may identify the reference point in the first monitoring image automatically without user intervention. The automatic identification of the reference point may be performed according to an image analysis technique (e.g., an image segmentation algorithm, an object recognition algorithm), a machine learning based technique (e.g., a trained neural network model for feature point detection), or the like, or any combination thereof. As yet another example, the reference point may be determined semi-automatically by the processing device 120 with user intervention. For example, a user may provide a parameter relating to the image analysis technique and/or a position parameter relating to the reference point, then the processing device 120 may determine the reference point based on the parameter(s) provided by the user. As another example, the user may make an adjustment to or confirm a preliminary reference point identification performed by the processing device 120.

In some embodiments, the processing device 120 may determine the target monitoring position based on the reference point and a position mapping relationship between the first capture device and the second capture device when the two capture devices monitor a same area or similar areas (e.g., partially overlapped areas). Take a specific point (which corresponds to an actual physical point) in a first image captured by the first capture device as an example, the position mapping relationship may include a coordinate relationship among a coordinate of the specific point in a first coordinate system of the first image, a coordinate of the second monitoring device in an actual spatial coordinate system when the second capture device captures a second image (e.g., an image with a point corresponding to the actual physical point as a center point) including the actual physical point, a coordinate of the actual physical point in the actual spatial coordinate system, and/or a coordinate of a point corresponding to the actual physical point in the second image in a second coordinate system (e.g., a coordinate system with a center of the second image as the origin and a predetermined length (e.g., 1 cm) as unit).

Merely by way of example, for an actual physical point A with a coordinate in the actual spatial coordinate system as $(x_0, y_0, z_0)$, it is assumed that a coordinate of a point A1 corresponding to the actual physical point A in the first coordinate system is $(x, y)$, a coordinate of a point A2 corresponding to the actual physical point A in the second coordinate system is $(x', y')$, and a coordinate of the second capture device when capturing an image including the actual physical point A is $(a, b, c)$, and the mapping relationship may indicate a relationship among the coordinates $(x_0, y_0, z_0)$, $(x, y)$, $(a, b, c)$, and/or $(x', y')$.

In some embodiments, the mapping relationship may be represented in the form of a table, a curve, a drawing, a mathematical expression, etc. The mapping relationship may be stored in a storage device (e.g., the storage 150) and the processing device 120 may retrieve the relationship from the storage device. Alternatively or additionally, the mapping relationship may be determined by the processing device 120 based on experimental data.

In some embodiments, the processing device 120 may determine the target monitoring position based on at least one historically marked object. For example, the processing device 120 may exclude one or more first objects from the at least one first object based on the at least one historically marked object and determine the target monitoring position based on position information associated with remainder first objects. More descriptions regarding the determination of the target monitoring based on the at least one historically marked object may be found elsewhere in the present disclosure (e.g., FIG. 9 and the description thereof).

In 530, the processing device 120 (e.g., the second determination module 430) may obtain a second monitoring image associated with the target monitoring position acquired by the second capture device (e.g., the second capture device 102). As used herein, the second monitoring image may be an image including object(s) located within a predetermined range of the target monitoring positon.

In some embodiments, after determining the target monitoring position, the processing device 120 may direct the second capture device to move to a position pointing to a monitoring region including the target monitoring position, and acquire the second monitoring image. In some embodiments, as described in connection with FIG. 1, the second monitoring image may be a monitoring frame in a monitoring video acquired by the second capture device. In some embodiments, a format of the second monitoring image may be the same as or different from the format of the first monitoring image.

In 540, the processing device 120 (e.g., the second determination module 430) may determine at least one second object in the second monitoring image.

In some embodiments, as described in connection with operation 510, the processing device 120 may determine the at least one second object in the second monitoring image based on an approach similar to that is used to determine the at least one first object in the first monitoring image. In some embodiments, the second monitoring image may be transmitted to a terminal device (e.g., the terminal device 140) and a user may select the at least one second object in the second monitoring image via a user interface implemented on the terminal device.

In 550, the processing device 120 (e.g., the identification module 440) may identify at least one matched second object from the at least one second object based on relevancy information among the at least one second object and the at least one first object, wherein for each of the at least one matched second object, a relevancy between the matched second object and one of the at least one first object satisfies a preset matching condition. As used herein, the "relevancy" may indicate a similarity degree between a second object and a first object. The greater the relevancy is, the greater the similarity degree between the second object and the first object may be, and the greater the probability that second object and the first object corresponding to a same object may be.

In some embodiments, the relevancy information may be associated with position information of the at least one first object and the at least one second object, feature information of the at least one first object and the at least one second object, etc. Take a specific second object and a specific first object as an example, the processing device 120 may determine a position relevancy between the second object and the first object and a feature relevancy (also referred to as a "feature matching operation") between the second object and the first object. Further, the processing device 120 may determine a final relevancy between the second object and the first object based on the position relevancy and the feature relevancy, for example, a weighted result of the position relevancy and the feature relevancy.

In some embodiments, also take a specific second object and a specific first object as an example, the position relevancy may be determined based on a position difference (also can be considered as a "distance") between the second object and the first object. The less the position difference is, the greater the position relevancy between the first object and the second object may be, and the relevancy between the second object and the first object may be.

In some embodiments, since the first capture device and the second capture device may correspond to different parameters, the first monitoring image and the second monitoring image may correspond to different coordinate systems. Accordingly, the processing device 120 may perform a coordinate transformation on the first monitoring image (or the first object) and/or the second monitoring image (or the second object) to make the first monitoring image (or the first object) and the second monitoring image (or the second object) correspond to a same coordinate system. Then the processing device 120 may determine a coordinate of a point (e.g., a center point) of the first object and a coordinate of a point (e.g., a center point) of the second object under the same coordinate system, and determine the distance between the first object and the second object based on the coordinate of the point of the first object and the coordinate the point of the second object. Additionally or alternatively, the first coordinate system of the first capture device and the second coordinate system of the second capture device may be pre-constructed in a same manner (or may be pre-calibrated or pre-registered), that is, the first monitoring image and the second monitoring image correspond to a same coordinate system, thus the coordinate transformation may be omitted.

In some embodiments, also take a specific second object and a specific first object as an example, the feature relevancy may be determined based on a feature difference (also can be considered as a "feature similarity") between feature information of the first object and feature information of the second object. The greater the feature difference is, the greater the feature relevancy between the second object and the first object may be. In some embodiments, the feature information of the first object and/or the second object may include an attributive feature, an appearance feature, or the like, or any combination thereof. As used herein, the attributive feature may include a feature which may be used to indicate a type of an object, for example, a walking person, a vehicle, a still device, etc. The appearance feature may include a contour, a texture, a color, a pixel value, a contrast, a grayscale, or the like, or any combination thereof.

In some embodiments, the processing device 120 may determine a first feature vector corresponding to the feature information of the first object and a second feature vector corresponding to the feature information of the second object, and determine the feature difference between the first object and the second object based on a vector distance between the first feature vector and the second feature vector. In some embodiments, the vector distance may include a Euclidean distance, a Manhattan distance, a Chebyshev distance, a Minkowski distance, a Mahalanobis distance, an angle cosine distance, etc.

In some embodiments, there may be different types of feature information, for each type of feature information, the processing device 120 may determine a corresponding intermediate feature difference between the first object and the second object and determine the final feature difference between the first object and the second object based on a plurality of intermediate feature differences, for example, a weighted result of the plurality of intermediate feature differences, an average result of the plurality of intermediate feature differences, a variance of the plurality of intermediate feature differences, a product of the plurality of intermediate feature differences, etc.

In some embodiments, the processing device 120 may determine the feature relevancy between the first object and the second object based on a feature coincidence rate. The greater the feature coincidence rate is, the greater the feature relevancy between the first object and the second object may be. As used herein, the feature coincidence rate refers to a rate of coincident features among all features, for example, it is assumed that during the feature relevancy processing, the processing device 120 extracts three first features (e.g., a first contour, a first color, and a first grayscale) of the first object and three second features (e.g., a second contour, a second color, and a second grayscale) of the second object, the first contour is the same as or substantially the same as the second contour, then the feature "contour" can be considered as the "coincident feature," accordingly, the feature coincidence rate can be determined as a ratio (i.e., ⅓) of a count (i.e., 1) of coincident features to a count of all features (i.e., 3).

In some embodiments, as described above, take a specific matched second object as an example, the preset matching condition may include that the relevancy between the matched second object and one (which can be considered as the first object that is matched with the matched second object) of the at least one first object is larger than a relevancy threshold, a position relevancy between the matched second object and one of the at least one first object is larger than a position relevancy threshold, a feature relevancy between the matched second object and one of the at least one first object is larger than a feature relevancy threshold, etc. In some embodiments, the preset matching condition may be predetermined or may be dynamically adjusted by the processing device 120 according to different conditions.

In some embodiments, for each of the at least one first object, the processing device 120 may traverse the at least one second object to identify whether there is a corresponding second object (i.e., a second object satisfying the preset matching condition) that is matched with the first object, accordingly, if yes, the processing device 120 may designate the second object as a matched second object. In some embodiments, for a portion of the at least one first object, there may be no matched second object, in this situation, the portion of the at least one first object may be further processed in the subsequent process (e.g., a next processing cycle). In some embodiments, take a specific first object as an example, there may be multiple second objects satisfying the preset matching condition, in this situation, the processing device 120 may determine a second object with the highest relevancy with the first object as the matched second object.

In some embodiments, for each of the at least one second object, the processing device 120 may traverse the at least one first object to identify whether there is a corresponding first object (i.e., a first object satisfying the preset matching condition) that is matched with the second object, accordingly, if yes, the processing device 120 may designate the second object as a matched second object.

In 560, the processing device 120 (e.g., the capturing module 450) may direct the second capture device to capture at least one capture image of the at least one matched second object.

In some embodiments, for each of the at least one matched second object, the second capture device may capture a corresponding capture image. In some embodiments, the second capture device may capture a capture image including part or all of the at least one matched second object. In some embodiments, for each of the at least one matched second object, the second capture device may capture multiple capture images corresponding to the matched second object. For example, the processing device 120 may direct multiple second capture devices to capture the multiple capture images corresponding to the matched second object simultaneously or in sequence.

In some embodiments, for each of the at least one capture image, the processing device 120 may determine whether the quality of the capture image satisfies a quality requirement (e.g., a resolution requirement, a color requirement, a pixel value requirement, a contrast requirement, a grayscale requirement). In response to determining that the quality of the capture image does not satisfy the quality requirement, the processing device 120 may direct the second capture device to re-capture a capture image. In some embodiments, the processing device 120 may determine the quality of a capture image using an image quality evaluation model. For example, the image quality evaluation model may be configured to extract quality feature of the capture image, map the quality feature to a value (e.g., a probability), and determine whether the capture image satisfies the quality requirement based on the value. In some embodiments, the image quality evaluation model may include but is not limited to a Convolutional Neural Network (CNN) model, a Recurrent Neural Network (RNN) model, a Long Short Term Memory Network model (LSTM) model, etc.

In some embodiments, for each of the at least one matched second object, the processing device 120 may mark a first object that is matched with the matched second object and/or the matched second object via a marker (e.g., number, a text, a graph, an identifier) indicating that the first object and the second object correspond to a same object. For example, the processing device 120 may mark the first object and the second object with a same number. As another example, the processing device 120 may enclose the first object that is matched with the matched second object with a bounding box. In some embodiments, at least one marked first object corresponding to the at least one matched second object may be ignored in a subsequent capturing process.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 540 and operation 550 may be integrated into a single operation, in which the processing device 120 may determine the at least one second object and the at least one matched second object from the at least one second object.

Figure 6:
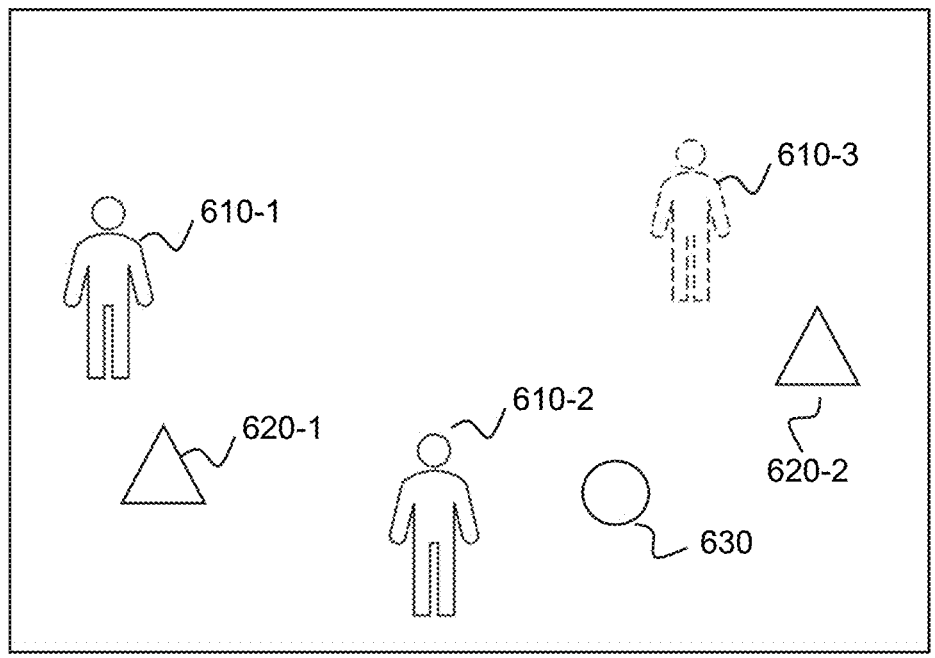
FIG. 6 is a schematic diagram illustrating an exemplary first monitoring image according to some embodiments of the present disclosure.

FIG. 6 is a schematic diagram illustrating an exemplary first monitoring image according to some embodiments of the present disclosure.

As shown in FIG. 6, the first monitoring image 600 may include at least one first object (e.g., a walking person 610-1, a walking person 610-2, a walking person 610-3, a still device 620-1, a still device 620-2) and a non-capture object 630 (i.e., a non-interest of object).

As described in connection with operation 560, for each of the at least one matched second object, the processing device 120 may mark a first object that is matched with the matched second object. Further, at least one marked first object corresponding to the at least one matched second object may be ignored in a subsequent capturing process. As shown in FIG. 6, the waling person 610-3 denoted by a dotted line is matched with a matched second object and may be marked and may be ignored in a subsequent capturing process.

Figure 7:
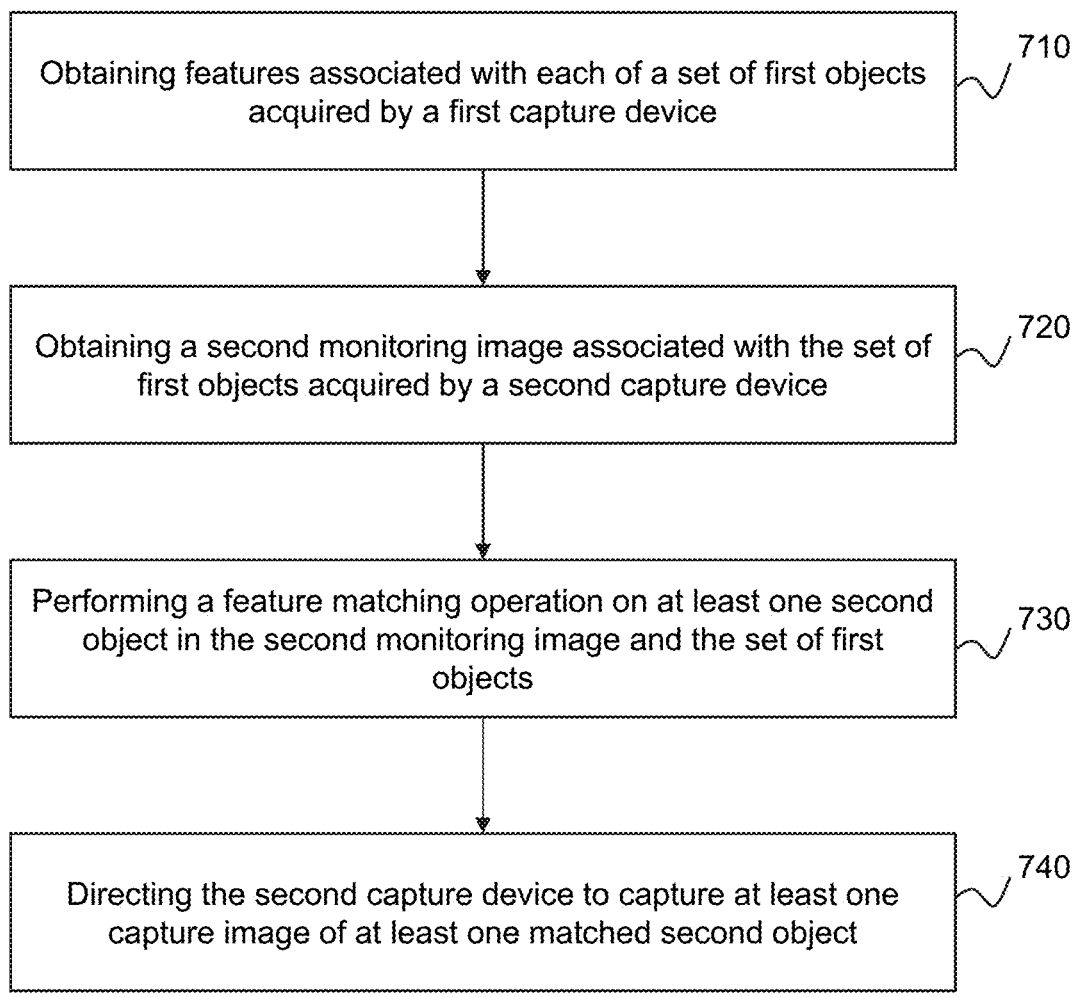
FIG. 7 is a flowchart illustrating an exemplary process for capturing at least one capture image of an object according to some embodiments of the present disclosure.

FIG. 7 is a flowchart illustrating an exemplary process for capturing at least one capture image of an object according to some embodiments of the present disclosure. In some embodiments, the process 700 may be implemented as a set of instructions (e.g., an application) stored in the storage ROM 230 or RAM 240. The processor 220, and/or the modules illustrated in FIG. 4 may execute the set of instructions, and when executing the instructions, the processor 220, and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting. In some embodiments, process 700 may be an exemplary example of process 500.

In 710, the processing device 120 (e.g., the first determination module 410) and/or the controller 103 may obtain features associated with each of a set of first objects (also referred to as "objects to be captured") acquired by a first capture device (e.g., the first capture device 101).

Figure 8A:
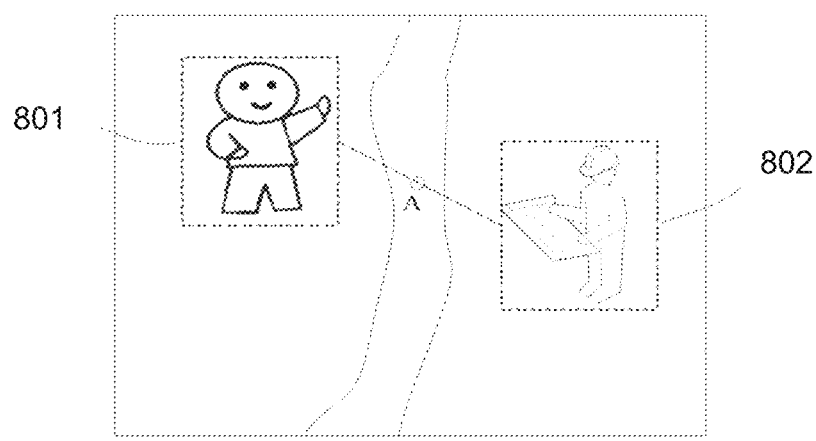
FIG. 8A is a schematic diagram illustrating an exemplary first monitoring image according to some embodiments of the present disclosure.

As described in connection with operation 510, the processing device 120 may determine the set of first objects in a first monitoring image acquired by the first capture device. For example, as illustrated in FIG. 8A, a first monitoring image 800 includes a first object 801 and a first object 802. In some embodiments, the features associated with each of the set of first objects may include a contour, a texture, a color, a pixel value, or the like, or any combination thereof. In some embodiments, the features associated with each of the set of first objects may be obtained according to the following examples.

Example 1

The controller 103 may extract features of each of objects in the first monitoring image. Then the controller 103 may perform a feature matching operation on the objects in the first monitoring image and one or more pre-stored objects (also can be referred to as "historically marked objects" or "historically captured objects") that have been captured, and determine objects that are not matched with any one of the pre-stored objects as the set of first objects.

In some embodiments, the controller 103 may obtain the features of each of the objects in the first monitoring image by processing the first monitoring image using an image processing model. The image processing model may be generated by training a preliminary model using at least one training sample. Each of the at least one training sample may include a sample monitoring image associated with one or more objects and features of each of the object(s) annotated in the sample monitoring image.

In some embodiments, the image processing model may be of any type of machine learning model. Merely by way of example, the image processing model may include an artificial neural network (ANN), a random forest model, a support vector machine, a decision tree, a convolutional neural network (CNN), a Recurrent Neural Network (RNN), a deep learning model, a Bayesian network, a K-nearest neighbor (KNN) model, a generative adversarial network (GAN) model, etc. The training of the image processing model may be implemented according to a machine learning algorithm, such as an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the image processing model may be a supervised learning algorithm, a semi-supervised learning algorithm, an unsupervised learning algorithm, or the like.

Alternatively or additionally, the controller 103 may obtain the features of each of the objects in the first monitoring image using an edge detection approach.

In some embodiments, after obtaining the features of each of the objects in the first monitoring image, the controller 103 may perform a feature matching operation on the feature of each of the objects in the first monitoring image and features of the pre-stored object(s). Specifically, for each of the objects in the first monitoring image, the controller 103 may determine a similarity degree between the features of the object and the features of each of the pre-stored object(s), and determine whether the similarity degree is less than or equal to a preset threshold. Take a specific object in the first monitoring image as an example, in response to determining that the similarity degree between the features of the object and the features of any one of the pre-stored object(s) is less than or equal to the preset threshold, the controller 103 may determine that the features of the object are not matched with the features of any one of the pre-stored object(s) and designate the object as a first object; in response to determining that the similarity degree between the features of the object and the features of one of the pre-stored object(s) is greater than the preset threshold, the controller 103 may determine that the object is matched with one of the pre-stored object(s), which indicates that the object has been captured before (e.g., as described in connection with operation 560, the object was historically captured by the second capture device), then the object is excluded and will not be repeatedly captured further.

Example 2

The features of each of the set of first objects may be obtained by the first capture device 101.

Specifically, the first capture device 101 may obtain the features of each of the objects in the first monitoring image in a similar approach described in Example 1. The first capture device 101 may further perform a feature matching operation on the features of each of the objects in the first monitoring image and the features of each of the pre-stored object(s) and determine the set of first objects. Then the first capture device 101 may transmit the features of each of the set of first objects to the controller 103.

Example 3

The first capture device 101 may obtain the features of each of the objects in the first monitoring image. Then a feature matching operation may be performed on the objects in the first monitoring image and one or more pre-stored objects and the features of the set of first objects may be determined.

Specifically, the first capture device 101 may identify the objects in the first monitoring image using an object detection model and transmit the features of the objects to the controller 103. Then the controller 103 may perform a feature matching operation on the objects in the first monitoring image and the one or more pre-stored objects, and determine the features of the set of first objects.

In some embodiments, the object detection model may be generated by training a preliminary model using at least one training sample. Each of the at least one training sample may include a sample monitoring image and object(s) annotated in the sample monitoring image. In some embodiments, the object(s) may be annotated in the sample monitoring image manually, semi-automatically, or automatically. For example, the sample monitoring image may be transmitted to a terminal device (e.g., the terminal device 140) or the first capture device 101, then a user may annotate the object(s) in the sample monitoring image via a user interface implemented on the terminal device or the first capture device 101. As another example, the first capture device 101 may detect the object(s) in the sample monitoring image automatically without user intervention. The automatic identification of the object(s) may be performed according to an image analysis technique (e.g., an image segmentation algorithm, an object recognition algorithm), a machine learning-based technique (e.g., a trained neural network model for feature point detection), or the like, or any combination thereof. As yet another example, the object(s) may be determined semi-automatically by the first capture device 101 with user intervention. For example, a user may provide a parameter relating to the image analysis technique and/or a parameter relating to an object, then the first capture device 101 may identify the object(s) based on the parameter(s) provided by the user. As another example, the user may make an adjustment to or confirm a preliminary object identification performed by the first capture device 101.

In some embodiments, an objective function (e.g., a loss function) may be used to evaluate how well the preliminary model is trained. According to the objective function, the first capture device 101 may adjust the preliminary model until the objective function reaches a desired value or converges. After the objective function reaches the desired value or converges, the adjusted preliminary model may be designated as the object detection model.

In 720, the processing device 120 (e.g., the second determination module 420) and/or the controller 103 may obtain a second monitoring image associated with the set of first objects acquired by a second capture device (e.g., the second capture device 102).

Specifically, as described in connection with operation 520 and operation 530, the controller 103 (e.g., the target monitoring position determination module 420) may determine a target monitoring position of the first capture device 101 based on the first monitoring image and direct the second capture device 102 to be rotated to the target monitoring position so that the second capture device 102 can acquire a second monitoring image (e.g., a monitoring frame in a monitoring video) associated with the set of first objects. In some embodiments, a monitoring region of the second capture device 102 may be the same as, substantially the same as, or different from that of the first capture device 101 when the first capture device 101 acquires the first monitoring image. In actual situations, since position information of the set of first objects in the first monitoring image may change (e.g., a person may move with time), second object(s) in the second monitoring image may include all the set of first objects or a portion of the set of first objects, that is, the second object(s) in the second monitoring image may be the same as or different from the set of first objects in the first monitoring image.

In some embodiments, as described in connection with operation 520, the controller 103 may determine a reference point in the first monitoring image and determine acquisition parameters (e.g., a rotation angle) of the second capture device 102 based on the reference point and a mapping relationship between the first capture device 101 and the second capture device 102. Further, the controller 102 may direct the second capture device 102 to acquire the second monitoring image based on the acquisition parameters. More descriptions regarding the reference point and/or the mapping relationship may be found elsewhere in the present disclosure (e.g., operation 520 and the description thereof).

Figure 8B:
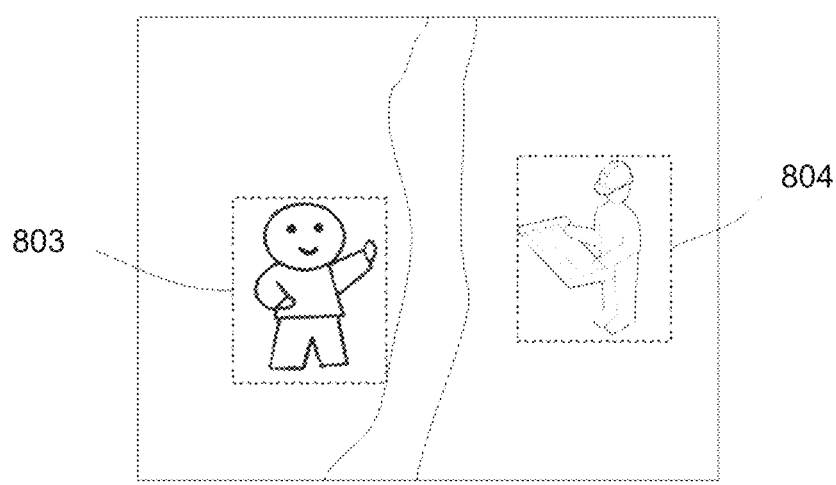
FIG. 8B is a schematic diagram illustrating an exemplary second monitoring image according to some embodiments of the present disclosure.

For example, as illustrated in FIG. 8A, a first monitoring image 800 may include a first object 801 and a first object 802. The controller 103 may determine a reference point A in the first monitoring image 800, determine position information associated with the reference point A, and designate the position information associated with the reference point A as a target monitoring position of the second capture device 102. Then the controller 103 may direct the second capture device 102 to acquire a second monitoring image 850 based on the target monitoring position. As illustrated in FIG. 8B, the second monitoring image 850 may include a second object 803 and a second object 804 corresponding to the first object 801 and the first object 802, respectively. It can be seen that a relative position between the second object 803 and the second object 804 in the second monitoring image 850 is different from a relative position between the first object 801 and the first object 802 in the first monitoring image 800.

In 730, the processing device 120 (e.g., the identification module 440) and/or the controller 103 may perform a feature matching operation on at least one second object in the second monitoring image and the set of first objects. As described in connection with operation 710, the controller 103 may perform the feature matching operation in a similar way which is not repeated here. Take a specific first object as an example, in response to that a similarity degree between features of the first object and one of the at least one second object is greater than a preset threshold, the controller 103 may determine that the second object (which can be referred to as a "matched second object") is matched with the first object.

Alternatively or additionally, if no matched second object is identified in the second monitoring image, the controller 103 may direct the second capture device 102 to be moved along a direction towards a position of at least one of the first objects until a matched second object is identified.

In 740, the processing device 120 (e.g., the capturing module 450) and/or the controller 103 may direct the second capture device 102 to capture at least one capture image of at least one matched second object. In some embodiments, the second capture device 102 may capture a capture image of each of the at least one matched second object. In some embodiments, the controller 103 may direct the second capture device 102 to capture a capture image including part or all of the at least one matched second object.

In some embodiments, other than the at least one matched second object, the second monitoring image may include unmatched second object(s) (i.e., second object(s) which are not matched with any of the set of first objects) (can be referred to as "additional object(s)"). In some embodiments, in order to avoid missing object(s) to be captured, the second capture device 102 may also capture image(s) including the additional object(s). In some embodiments, in order to reduce repeat capture rate, before capturing the capture image(s) including the additional object(s), the controller 103 may determine whether the additional object(s) have been captured. Specifically, the controller 103 may perform a feature matching operation on features of the additional object(s) and features of one or more pre-stored objects to determine whether the additional object(s) have been captured. More descriptions regarding the feature matching operation may be found elsewhere in the present disclosure (e.g., operation 550, operation 710, and the descriptions thereof). In response to that the additional object(s) have been captured, no capture is needed to be performed on the additional object(s); in response to that the additional object(s) have not been captured, the controller 103 may direct the second capture device 102 to capture one or more images including the additional object(s).

In some embodiments, for each of the at least one matched second object, the controller 103 may mark a first object that is matched with the matched second object. For example, the controller 103 may mark a state of the first object as "captured." In some embodiments, the controller 103 may transmit the capture image(s) of the matched second object to and the state of the first object to the second capture 102 to inform the second capture 102 that the capture image(s) of the first object have been captured, thereby reducing repeat capture rate.

Similarly, for each of the additional object(s), after capture image(s) of the additional object are captured, the controller 103 may mark a first object corresponding to the additional object in the first monitoring image. For example, the controller 103 may mark a state of the first object corresponding to the additional object as "captured." The controller 103 may transmit the capture image(s) of the additional object and the state of the first object corresponding to the additional object to the second capture 102 to inform the second capture 102 that the capture image(s) of the additional object have been captured, thereby reducing repeat capture rate.

In some embodiments, the controller 103 may be implemented in the first capture device 101, accordingly, the first capture device 101 is also informed when the controller 103 obtains the capture image(s). Alternatively or additionally, the second capture device 102 may mark a first object that is matched with a matched second object and transmit capture image(s) of the matched second object and the state of the first object to the controller 103.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
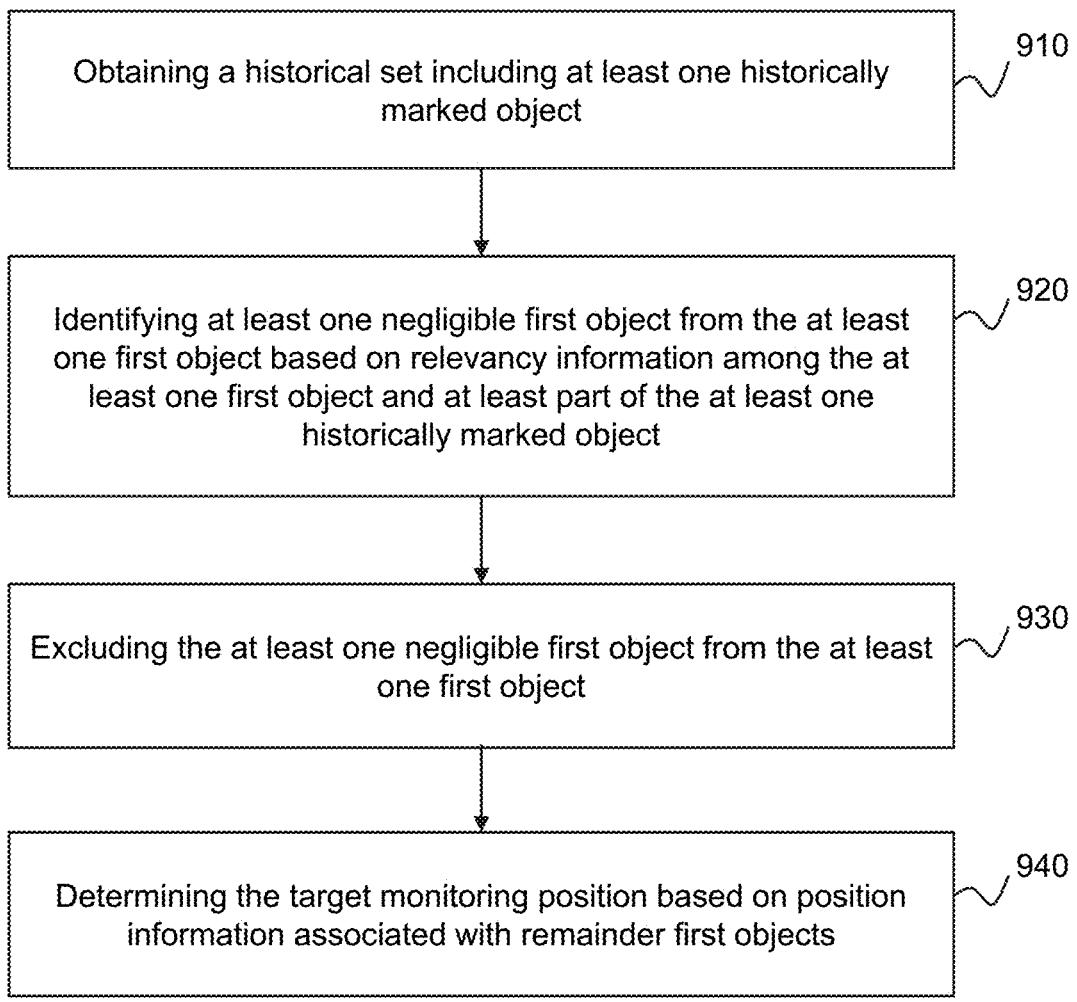
FIG. 9 is a flowchart illustrating an exemplary process for determining a target monitoring position according to some embodiments of the present disclosure.

FIG. 9 is a flowchart illustrating an exemplary process for determining a target monitoring position according to some embodiments of the present disclosure. In some embodiments, process 900 may be an exemplary embodiment of operation 520. In some embodiments, the process 900 may be implemented as a set of instructions (e.g., an application) stored in the storage ROM 230 or RAM 240. The processor 220, and/or the modules illustrated in FIG. 4 may execute the set of instructions, and when executing the instructions, the processor 220, and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting.

In 910, the processing device 120 (e.g., the first determination module 410) may obtain a historical set including at least one historically marked object (also referred to as "historically captured object" or "pre-stored object").

In some embodiments, the historical set including at least one historically marked object may be generated by a first capture device (e.g., the first capture device 101), a second capture device (e.g., the second capture device 102), a controller (e.g., the controller 103), and/or the processing device 120. In some embodiments, the historical set may be transmitted to a storage device (e.g., the storage 150, the ROM 230, the RAM 240, the storage 390, or an external storage) disclosed elsewhere in the present disclosure. In some embodiments, the processing device 120 may obtain the historical set from the first capture device, the second capture device, the controller, and/or the storage device directly or via the network 130.

In 920, the processing device 120 (e.g., the first determination module 410) may identify at least one negligible first object from the at least one first object based on relevancy information among the at least one first object and at least part of the at least one historically marked object, wherein for each of the at least one negligible first object, a relevancy between the negligible first object and one of the at least one historically marked object satisfies a preset matching condition.

As described in connection with operation 550, the "relevancy" between a first object and a historically marked object refers to a similarity degree between the first object and the historically marked object. The greater the relevancy is, the greater the similarity degree between the first object and the historically marked object may be, and the greater the possibility that the first object and the historically marked object correspond to a same object may be.

In some embodiments, the relevancy information may be associated with feature information of the at least one first object and at least part of the at least one historically marked object. Accordingly, take a specific first object and a specific historically marked object as an example, the processing device 120 may determine a feature relevancy (also referred to as a "feature matching operation") between the first object and the historically marked object. More descriptions regarding the relevancy information and/or the feature relevancy may be found elsewhere in the present disclosure (e.g., operation 550 and the description thereof), which are not repeated here.

In some embodiments, take a specific negligible first object as an example, the preset matching condition may include that the relevancy between the negligible first object and one (which can be considered as the historically marked object that is matched with the negligible first object) of the at least one historically marked object is larger than a relevancy threshold. In some embodiments, the preset matching condition may be predetermined or may be dynamically adjusted by the processing device 120 according to different conditions.

In 930, the processing device 120 (e.g., the first determination module 410) may exclude the at least one negligible first object from the at least one first object. That is, since for each of the at least one negligible first object, a relevancy between the negligible first object and one of the at least one historically marked object satisfies a preset matching condition, which indicates that the negligible first object has been captured historically, the negligible first object is excluded and is not processed (or is not captured) in the subsequent process, thereby reducing repeat capture rate.

In 940, the processing device 120 (e.g., the target monitoring position determination module 420) may determine the target monitoring position based on position information associated with remainder first objects. More descriptions regarding the determination of the target monitoring position may be found elsewhere in the present disclosure (e.g., operation 520 and the description thereof).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 10 is a flowchart illustrating an exemplary process for determining a target monitoring position according to some embodiments of the present disclosure. In some embodiments, process 1000 may be an exemplary embodiment of operation 520. In some embodiments, the process 1000 may be implemented as a set of instructions (e.g., an application) stored in the storage ROM 230 or RAM 240. The processor 220, and/or the modules in FIG. 4 may execute the set of instructions, and when executing the instructions, the processor 220, and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting.

In 1010, the processing device 120 (e.g., the target monitoring position determination module 420) may determine a cluster by processing the position information associated with the at least one first object using a clustering algorithm.

In some embodiments, the processing device 120 may determine a plurality of sub-clusters by processing the position information associated with the at least one first object, wherein each of the plurality of sub-clusters corresponds to at least one first object. Further, the processing device 120 may determine a center point of the cluster based on a plurality of center points corresponding to the plurality of sub-clusters. For example, the processing device 120 may designate a center point of a sub-cluster with the largest count of first objects as the center point of the cluster.

In some embodiments, the clustering algorithm may include a K-Means cluster algorithm, a Meanshift cluster algorithm, a Density-Based Spatial Clustering of Application with Noise (DBSCAN) cluster algorithm, a Graph Community Detection cluster algorithm, or the like, or any combination thereof.

In some embodiments, the processing device 120 may adjust the clustering algorithm based on a shape of the second capture device. In some embodiments, a shape of the first capture device may be different from that of the second capture device. Accordingly, a first monitoring range of the first capture device may be different from a second monitoring range of the second capture device, and further, a size of a first image acquired by the first capture device may be different from that of a second image acquired by the second capture device. For example, the shape of the first capture device may include a cuboid, a cube, a cylinder, a cone, a pyramid, a prism, etc.; the shape of the second capture device may be a sphere, a hemisphere, etc. Accordingly, the size of the second image may be smaller than that of the first image.

Figure 11:
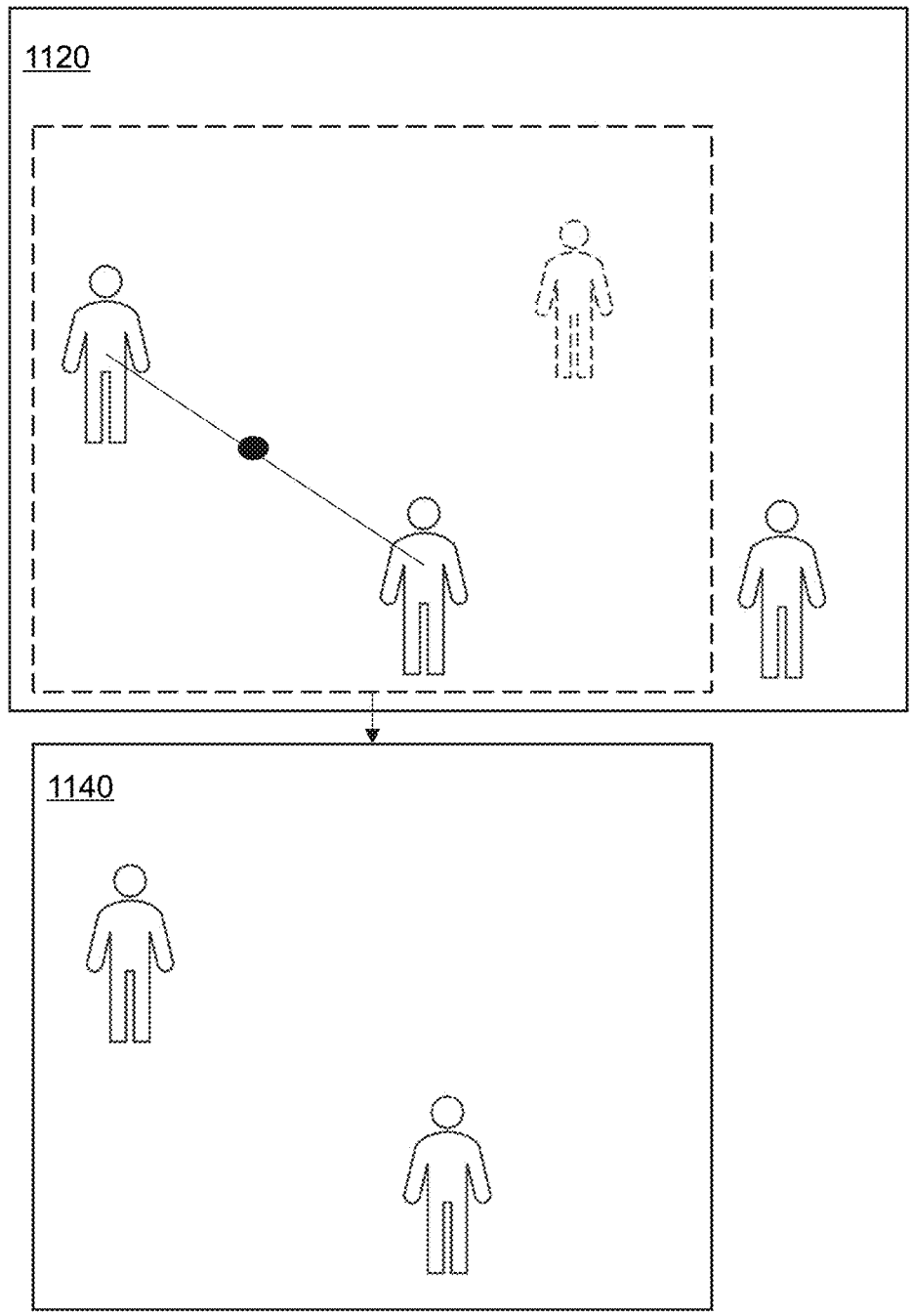
FIG. 11 is a schematic diagram illustrating an exemplary first monitoring image and an exemplary second monitoring image according to some embodiments of the present disclosure.

As illustrated in FIG. 11, the size (e.g., a length-width ratio) of the first image 1120 acquired by the first capture device is 11:8 and the size (e.g., a length-width ratio) of the second image 1140 acquired by the second capture device is 1:1 Accordingly, since the cluster is used to determine a target monitoring position associated with the second capture device, the processing device 120 may adjust a cluster parameter (e.g., a cluster radius, a cluster range) based on the size of the second image (or the second monitoring range). For example, the processing device 120 may adjust the cluster range (i.e., a dashed box with a length-width ratio as 1:1) to be the same as or substantially the same as the size of the second image, thereby reducing cluster error and improving the accuracy of the determination of the target monitoring position.

In 1020, the processing device 120 (e.g., the target monitoring position determination module 420) may determine the target monitoring position based on the cluster point. For example, the processing device 120 may designate the center point of the cluster as a reference point and determine the target monitoring position based on the reference point. More descriptions regarding the determination of the target monitoring position based on a reference point may be found elsewhere in the present disclosure (e.g., the operation 520 and the description thereof).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a flowchart illustrating an exemplary process for determining a target monitoring position according to some embodiments of the present disclosure. In some embodiments, process 1200 may be an exemplary embodiment of operation 520. In some embodiments, the process 1200 may be implemented as a set of instructions (e.g., an application) stored in the storage ROM 230 or RAM 240. The processor 220, and/or the modules in FIG. 4 may execute the set of instructions, and when executing the instructions, the processor 220, and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1210, for each of the at least one first object in the first monitoring image, the processing device 120 (e.g., the target monitoring position determination module 420) may determine motion information of the first object based on a plurality of first monitoring images including the first object acquired by the first capture device.

In some embodiments, the motion information of the first object may include a motion speed, a motion direction, a motion time, or the like, or any combination thereof. In some embodiments, the processing device 120 may determine the motion information of the first object based on a plurality of first monitoring images corresponding to a plurality of time points included in a time series. In some embodiments, a time interval between adjacent consecutive time points in the series may be fixed or unfixed. For example, the time interval between adjacent consecutive time points may be 0.1 seconds, 0.5 seconds, 1 second, 2 seconds, etc.

In some embodiments, the processing device 120 may determine the motion information of the first object based on position information of the first object in the plurality of first monitoring images. For example, take a specific first object H as an example, the plurality of the first monitoring images may include an image H1, an image H2, and an image H3, and coordinates of the first object H in the image H1, image H2, and the image H3 may be (0, 1), (0, 3), and (0, 5), respectively, under a same coordinate system. The processing device 120 may determine that the first object H moves along a Y-axis direction of the coordinate system at a motion speed of two units per second. As another example, if the position information of the first object in the plurality of first monitoring images remains unchanged, that is, the coordinates of the first object in the plurality of first monitoring images are the same in a same coordinate system, the processing device 120 may determine that the first object is under a static state.

In 1220, the processing device 120 (e.g., the target monitoring position determination module 420) may obtain motion information of a second capture device.

In some embodiments, the motion information of the second capture device may include a motion speed (e.g., a translation speed, a rotation speed), a motion direction (e.g., a translation direction, a rotation direction, a rotation angle), a motion time, or the like, or any combination thereof. In some embodiments, the processing device 120 may obtain the motion information of the second capture device directly from the second capture device, for example, from one or more sensing components (e.g., a velocity sensor, an acceleration sensor, a positioning component) installed on the second capture device. In some embodiments, the processing device 120 may determine the motion information of the second capture device by processing detection information acquired by the one or more sensing components installed on the second capture device. For example, the processing device 120 may determine a moving distance and/or a translation speed of the second capture device based on position information detected by the positioning component.

In 1230, the processing device 120 (e.g., the target monitoring position determination module 420) may determine the target monitoring position based on the monition information of the at least one first object and the motion information of the second capture device.

As described in connection with operation 520 and operation 530, the target monitoring position may be determined based on position information (e.g., a center point of a cluster) associated with the at least one first object in the first monitoring image and the second monitoring image may be acquired by the second capture device when the second capture device points to a monitoring region including the target monitoring position. That is, if the at least one first object is under a motion state, when the second capture device moves to the position pointing to the monitoring region, the position information of the at least one first object has changed.

Figure 13:
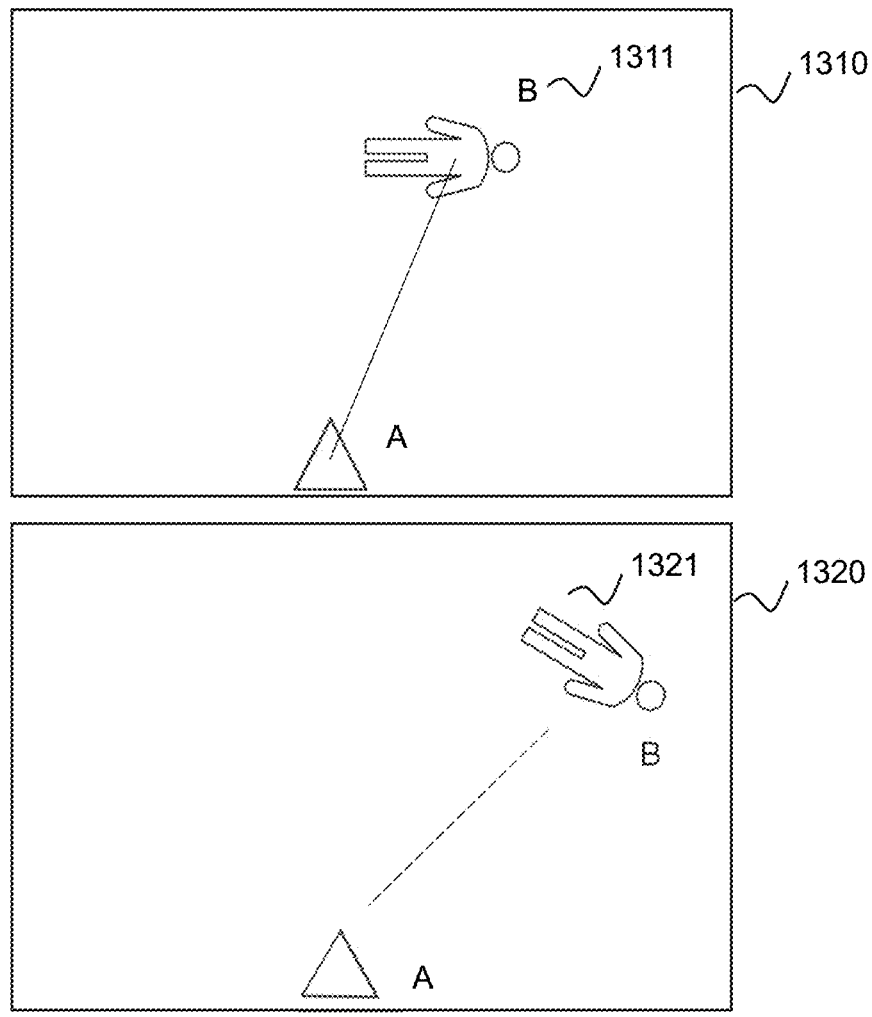
FIG. 13 is a schematic diagram illustrating exemplary first monitoring images associated with a moving object according to some embodiments of the present disclosure.

For example, as illustrated in FIG. 13, it is assumed that there is only one first object B which is under a motion state (an object A is a static object used as a reference object). When a first monitoring image 1310 is acquired (referred to as a time point t), the first object B is located at a position 1311 in the first monitoring image 1310. Then the target monitoring position is determined based on position information of the first object B, the second capture device moves to a position pointing to a monitoring region including the target monitoring position, and a second monitoring image is acquired (referred to as a time point (t+n)). However, at the time point (t+n), the first object B is located at a position 1321 in another first monitoring image 1320 acquired at the time point (t+n), that is, the position information of the at least one first object has changed during the motion period of the second capture device, accordingly, the first object B may not be included in the second monitoring image acquired with respect to the target monitoring position. It can be seen that if the target monitoring position is determined only based on the position information of the first object B without the motion information taken into consideration, the second monitoring image acquired based on the target monitoring position may be undesirable or even unusable.

Accordingly, in some embodiments, the processing device 120 may determine the target monitoring position using a motion determination model. For example, the processing device 120 may input position information of the at least one first object in the first monitoring image, the motion information of the at least one first object, and the motion information of the second capture device into the motion determination model and determine the target monitoring position based on an output of the motion determination model. In some embodiments, the motion determination model may include a Deep Neural Networks (DNN) model, a StarNet model, a Recurrent Neural Network (RNN) model, or the like, or any combination thereof. In some embodiments, the motion determination model may be generated by training a preliminary model using at least one training sample. Each of the at least one training sample may include position information of object(s) in a sample first monitoring image, motion information of the object(s), motion information of a second capture device, and an annotated target monitoring position. The training of the motion determination model may be similar to that of the image processing model described in operation 510 and is not repeated herein.

The basic concepts have been described above. Obviously, for those skilled in the art, the detailed disclosure is merely by way of example, and does not constitute a limitation on the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. In addition, certain features, structures, or characteristics in one or more embodiments of the present disclosure may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters configured to illustrate the broad scope of some embodiments of the present disclosure are approximations, the numerical values in specific examples may be as accurate as possible within a practical scope.

Each patent, patent application, patent application publication and other materials cited herein, such as articles, books, instructions, publications, documents, etc., are hereby incorporated by reference in their entirety. In addition to the application history documents that are inconsistent or conflicting with the contents of the present disclosure, the documents that may limit the widest range of the claim of the present disclosure (currently or later attached to this application) is excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail. At last, it should be understood that the embodiments described in the present disclosure are merely illustrative of the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly described and described by the present disclosure.

What is claimed is:

1. A method implemented on a computing device having at least one processor and at least one storage medium including a set of instructions for obtaining at least one image, comprising:
   determining at least one first object in a first monitoring image acquired by a first capture device;
   determining a target monitoring position based on position information associated with the at least one first object in the first monitoring image;
   obtaining a second monitoring image associated with the target monitoring position acquired by a second capture device;
   determining at least one second object in the second monitoring image;
   identifying at least one matched second object from the at least one second object based on relevancy information among the at least one second object and the at least one first object, wherein for each of the at least one matched second object, a relevancy between the matched second object and one of the at least one first object satisfies a preset matching condition; and
   directing the second capture device to capture at least one capture image of the at least one matched second object.

2. The method of claim 1, further comprising:
   for each of the at least one matched second object, marking a first object that is matched with the matched second object.

3. The method of claim 2, wherein at least one marked first object corresponding to the at least one matched second object is ignored in a subsequent capturing process.

4. The method of claim 1, wherein the determining the target monitoring position based on the position information associated with the at least one first object in the first monitoring image comprises:
   obtaining a historical set including at least one historically marked object;
   identifying at least one negligible first object from the at least one first object based on relevancy information among the at least one first object and at least part of the at least one historically marked object, wherein for each of the at least one negligible first object, a relevancy between the negligible first object and one of the at least one historically marked object satisfies the preset matching condition;
   excluding the at least one negligible first object from the at least one first object; and
   determining the target monitoring position based on position information associated with remainder first objects.

5. The method of claim 1, wherein the determining the target monitoring position based on the position information associated with the at least one first object in the first monitoring image comprises:

determining a cluster by processing the position information associated with the at least one first object using a clustering algorithm; and
determining the target monitoring position based on the cluster.

6. The method of claim 5, further comprising:
adjusting the clustering algorithm based on a shape of the second capture device.

7. The method of claim 1, wherein the determining the target monitoring position based on the position information associated with the at least one first object in the first monitoring image comprises:
for each of the at least one first object, determining motion information of the first object based on a plurality of first monitoring images including the first object acquired by the first capture device;
obtaining motion information of the second capture device; and
determining the target monitoring position based on the motion information of the at least one first object and the motion information of the second capture device.

8. The method of claim 1, wherein the relevancy information is associated with at least one of:
position information of the at least one first object and the at least one second object; or
feature information of the at least one first object and the at least one second object.

9. The method of claim 8, wherein the feature information includes at least one of an attributive feature or an appearance feature.

10. The method of claim 9, wherein the appearance feature includes at least one of a contour, a texture, a color, a pixel value, a contrast, or a grayscale.

11. A system for obtaining at least one image, comprising:
at least one storage device including a set of instructions; and
at least one processor configured to communicate with the at least one storage device, wherein when executing the set of instructions, the at least one processor is configured to direct the system to perform operations including:
determining at least one first object in a first monitoring image acquired by a first capture device;
determining a target monitoring position based on position information associated with the at least one first object in the first monitoring image;
obtaining a second monitoring image associated with the target monitoring position acquired by a second capture device;
determining at least one second object in the second monitoring image;
identifying at least one matched second object from the at least one second object based on relevancy information among the at least one second object and the at least one first object, wherein for each of the at least one matched second object, a relevancy between the matched second object and one of the at least one first object satisfies a preset matching condition; and
directing the second capture device to capture at least one capture image of the at least one matched second object.

12. The system of claim 11, the operations further including:
for each of the at least one matched second object, marking a first object that is matched with the matched second object.

13. The system of claim 12, wherein at least one marked first object corresponding to the at least one matched second object is ignored in a subsequent capturing process.

14. The system of claim 11, wherein the determining the target monitoring position based on the position information associated with the at least one first object in the first monitoring image comprises:
obtaining a historical set including at least one historically marked object;
identifying at least one negligible first object from the at least one first object based on relevancy information among the at least one first object and at least part of the at least one historically marked object, wherein for each of the at least one negligible first object, a relevancy between the negligible first object and one of the at least one historically marked object satisfies the preset matching condition;
excluding the at least one negligible first object from the at least one first object; and
determining the target monitoring position based on position information associated with remainder first objects.

15. The system of claim 11, wherein the determining the target monitoring position based on the position information associated with the at least one first object in the first monitoring image comprises:
determining a cluster by processing the position information associated with the at least one first object using a clustering algorithm; and
determining the target monitoring position based on the cluster.

16. The system of claim 15, the operations further including:
adjusting the clustering algorithm based on a shape of the second capture device.

17. The system of claim 11, wherein the determining the target monitoring position based on the position information associated with the at least one first object in the first monitoring image comprises:
for each of the at least one first object, determining motion information of the first object based on a plurality of first monitoring images including the first object acquired by the first capture device;
obtaining motion information of the second capture device; and
determining the target monitoring position based on the motion information of the at least one first object and the motion information of the second capture device.

18. The system of claim 11, wherein the relevancy information is associated with at least one of:
position information of the at least one first object and the at least one second object; or
feature information of the at least one first object and the at least one second object.

19. The system of claim 18, wherein the feature information includes at least one of an attributive feature or an appearance feature.

20. A non-transitory computer readable medium, comprising executable instructions that, when executed by at least one processor, direct the at least one processor to perform a method, the method comprising:
determining at least one first object in a first monitoring image acquired by a first capture device;
determining a target monitoring position based on position information associated with the at least one first object in the first monitoring image;

obtaining a second monitoring image associated with the target monitoring position acquired by a second capture device;

determining at least one second object in the second monitoring image;

identifying at least one matched second object from the at least one second object based on relevancy information among the at least one second object and the at least one first object, wherein for each of the at least one matched second object, a relevancy between the matched second object and one of the at least one first object satisfies a preset matching condition; and directing the second capture device to capture at least one capture image of the at least one matched second object.

* * * * *